US012748005B2

(12) United States Patent
Herperger et al.

(10) Patent No.: US 12,748,005 B2
(45) Date of Patent: Sep. 29, 2026

(54) PRESSURE GAUGE FOR AN INFLATABLE ARTICLE

(71) Applicant: VENTETE LIMITED, London (GB)

(72) Inventors: Colin Herperger, London (GB); Steven Pippin, London (GB); Steven Davies, London (GB)

(73) Assignee: VENTETE LIMITED, London (GB)

( * ) Notice: Subject to any disclaimer, the term of this patent is extended or adjusted under 35 U.S.C. 154(b) by 413 days.

(21) Appl. No.: 18/551,937

(22) PCT Filed: Mar. 24, 2022

(86) PCT No.: PCT/GB2022/050740
§ 371 (c)(1),
(2) Date: Sep. 22, 2023

(87) PCT Pub. No.: WO2022/200796
PCT Pub. Date: Sep. 29, 2022

(65) Prior Publication Data

US 2024/0167899 A1 May 23, 2024

(30) Foreign Application Priority Data

Mar. 25, 2021 (GB) ..................................... 2104232

(51) Int. Cl.
*A42B 3/00* (2006.01)
*A42B 3/12* (2006.01)
*G01L 7/08* (2006.01)

(52) U.S. Cl.
CPC ................ *G01L 7/084* (2013.01); *A42B 3/00* (2013.01); *A42B 3/122* (2013.01)

(58) Field of Classification Search
CPC . G01L 19/147; G01L 9/0072; G01L 19/0645; G01L 19/0084; G01L 13/025;
(Continued)

(56) References Cited

U.S. PATENT DOCUMENTS 4,038,700 A 8/1977 Gyory
5,263,203 A * 11/1993 Kraemer ................ A42B 3/122 2/413

(Continued)

FOREIGN PATENT DOCUMENTS

ES 1 120 956 U 9/2014
GB 2016697 9/1979

(Continued)

OTHER PUBLICATIONS

Combined Search and Examination Report of British Patent Application No. 2104232.0, dated Jul. 6, 2021, 8 pages.

(Continued)

*Primary Examiner* — Andre J Allen
(74) *Attorney, Agent, or Firm* — HSML P.C.

(57) ABSTRACT

A pressure gauge is for an inflatable article and includes a housing, an indicating chamber defined within the housing, a resilient diaphragm located within the housing, and an indicating element located within the indicating chamber. The diaphragm is configured to expand upon an increase in pressure within the inflatable article. The diaphragm has a first surface and a second, opposing surface. The first surface of the diaphragm is configured to be in fluid communication with the interior of the inflatable article and the second surface of the diaphragm defines a boundary of the indicating chamber. The pressure gauge is configured so that the indicating element is moveable, by an expansion of the diaphragm, in a first direction away from a first position. The position of the indicating element relative to the housing provides an indication of the pressure within the inflatable article.

20 Claims, 9 Drawing Sheets

(58) Field of Classification Search
CPC ............... G01L 19/0007; G01L 9/0042; G01L 19/0038; G01L 9/0073; G01L 9/0075; G01L 9/0054; G01L 9/0055; G01L 19/04; G01L 7/00; G01L 7/04; G01L 19/148; G01L 19/14; G01L 19/143; G01L 17/00; G01L 7/18; G01L 19/0092; G01L 15/00; G01L 9/0051; G01L 7/041; G01L 9/12; G01L 9/065; G01L 19/0618; G01L 9/0052; G01L 9/125; G01L 7/16; G01L 19/0609; G01L 19/003; G01L 9/007; G01L 19/0627; G01L 19/0046; G01L 9/0022; G01L 9/06; G01L 19/0636; G01L 7/084; G01L 13/02; G01L 19/0023; G01L 19/142; G01L 7/043; G01L 19/08; G01L 9/0002; G01L 19/02; G01L 9/008; G01L 19/141; G01L 9/006; G01L 11/02; G01L 19/0672; G01L 23/10; G01L 23/18; G01L 19/0681; G01L 9/0077; G01L 19/12; G01L 27/005; G01L 7/082; G01L 9/0044; G01L 19/0015; G01L 19/0069; G01L 7/063; G01L 9/0001; G01L 19/146; G01L 21/12; G01L 27/002; G01L 27/007; G01L 9/16; G01L 11/00; G01L 19/00; G01L 9/0026; G01L 9/0089; G01L 9/045; G01L 9/14; G01L 19/0654; G01L 1/2281; G01L 11/025; G01L 13/00; G01L 13/026; G01L 11/008; G01L 7/22; G01L 9/0047; G01L 7/08; G01L 9/0076; G01L 9/0025; G01L 9/04; G01L 9/0035; G01L 19/0061; G01L 9/0005; G01L 9/0041; G01L 9/08; G01L 9/0019; G01L 9/10; G01L 21/00; G01L 9/00; G01L 11/006; G01L 19/06; G01L 19/086; G01L 9/0008; G01L 1/18; G01L 11/004; G01L 19/069; G01L 9/0057; G01L 19/083; G01L 19/10; G01L 19/16; G01L 9/0016; G01L 13/023; G01L 7/048; G01L 9/0048; G01L 9/0027; G01L 9/0086; G01L 9/0079; G01L 11/04; G01L 1/20; G01L 9/0091; G01L 27/00; G01L 11/002; G01L 23/24; G01L 7/182; G01L 1/02; G01L 19/0663; G01L 7/166; G01L 23/22; G01L 9/0036; G01L 9/0061; G01L 9/0039; G01L 23/125; G01L 19/145; G01L 9/0013; G01L 21/04; G01L 9/0045; G01L 9/0092; G01L 1/142; G01L 7/104; G01L 9/0033; G01L 9/0083; G01L 9/0098; G01L 1/2293; G01L 7/24; G01L 9/02; G01L 21/22; G01L 9/0029; G01L 7/022; G01L 1/205; G01L 9/0064; G01L 23/08; G01L 5/14; G01L 13/06; G01L 23/16; G01L 7/088; G01L 7/163; G01L 9/0007; G01L 23/222; G01L 1/16; G01L 1/2287; G01L 9/0085; G01L 9/025; G01L 1/2212; G01L 21/14; G01L 9/0004; G01L 23/02; G01L 9/003; G01L 9/085; G01L 1/14; G01L 1/148; G01L 9/0058; G01L 9/105; G01L 7/02; G01L 7/061; G01L 9/002; G01L 1/2231; G01L 13/028; G01L 9/0095; G01L 23/28; G01L 1/162; G01L 19/0076; G01L 7/12; G01L 9/0038; G01L 9/0032; G01L 21/10; G01L 7/024; G01L 19/149; G01L 1/246; G01L 7/086; G01L 1/005; G01L 5/228; G01L 7/06; G01L 1/2206; G01L 7/102; G01L 13/021; G01L 27/02; G01L 1/2262; G01L 1/24; G01L 1/26; G01L 23/00; G01L 9/0094; G01L 19/144; G01L 9/0082; G01L 1/125; G01L 9/0097; G01L 1/2268; G01L 11/06; G01L 21/30; G01L 21/34; G01L 23/221; G01L 7/187; G01L 7/20; G01L 1/146; G01L 23/26; G01L 7/068; G01L 1/144; G01L 1/225; G01L 13/04; G01L 23/32; G01L 7/14; G01L 1/165; G01L 23/12; G01L 1/241; G01L 7/045; G01L 1/086; G01L 1/22; G01L 7/108; G01L 9/18; G01L 1/127; G01L 17/005; G01L 5/18; G01L 1/245; G01L 21/32; G01L 1/183; G01L 1/2218; G01L 9/0023; G01L 1/243; G01L 23/145; G01L 5/0047; G01L 5/0076; G01L 9/0088; G01L 1/106; G01L 1/10; G01L 9/001; G01L 1/186; G01L 23/223; G01L 25/00; G01L 5/165; G01L 5/226; G01L 9/0017; G01L 1/044; G01L 3/245; G01L 9/005; G01L 1/08; G01L 21/16; G01L 3/1485; G01L 5/0038; G01L 5/162; G01L 5/225; G01L 7/026; G01L 7/065; G01L 9/0014; G01L 1/00; G01L 1/04; G01L 1/242; G01L 21/24; G01L 3/10; G01L 5/0004; G01L 5/0052; G01L 5/24; G01L 7/10; G01L 1/103; G01L 1/2275; G01L 1/247; G01L 21/02; G01L 21/26; G01L 23/225; G01L 3/102; G01L 3/105; G01L 5/223; G01L 7/028; G01L 9/0011; G01L 5/00; G01L 5/0028; G01L 5/243; G01L 1/083; G01L 1/12; G01L 21/36; G01L 23/04; G01L 23/14; G01L 23/30; G01L 3/103; G01L 5/0033; G01L 5/102; G01L 5/133; G01L 5/1627; G01L 5/166; G01L 7/185; G01L 1/255; G01L 21/08; G01L 5/0057; G01L 5/22; G01L 1/042; G01L 1/122; G01L 1/2225; G01L 1/2243; G01L 1/2256; G01L 1/248; G01L 2009/0067; G01L 2009/0069; G01L 21/06; G01L 23/06; G01L 3/00; G01L 3/06; G01L 3/1478; G01L 3/1492; G01L 3/18; G01L 3/24; G01L 3/242; G01L 5/0061; G01L 5/08; G01L 5/10; G01L 5/101; G01L 5/108; G01L 5/16; G01L 5/161; G01L 5/167; G01L 5/28; G01L 1/046; G01L 2009/0066; G01L 2019/0053; G01L 23/085; G01L 23/20; G01L 5/0071; G01L 5/008; G01L 5/06; G01L 5/171; G01L 7/106; G01M 9/06; G01M 3/3272; G01M 3/16; G01M 15/08; G01M 3/2815; G01M 15/106; G01M 15/14; G01M 3/3236; G01M 15/09; G01M 3/26; G01M 3/32; G01M 3/36; G01M 3/40; G01M 3/24; G01M 9/065; G01M 3/002; G01M 99/00; G01M 3/00; G01M 3/04; G01M 3/045; G01M 3/18; G01M 3/2838; G01M 3/2853; G01M 3/3227; G01M 3/38; G01M 3/2807; G01M 3/2876; G01M 3/3263; G01M 3/005; G01M 3/34; G01M 5/0025; G01M 5/005; G01M 15/00; G01M 17/027; G01M 3/243; G01M 3/3218; G01M 3/363; G01M 5/0033; G01M 5/0041; G01M 99/007; G01M 1/125; G01M 13/00; G01M 17/007; G01M 17/0078;

G01M 3/022; G01M 3/025; G01M 3/042; G01M 3/181; G01M 3/183; G01M 3/20; G01M 3/2823; G01M 3/2846; G01M 3/2892; G01M 3/3209; G01M 5/0083; G01M 9/00; G01M 10/00; G01M 11/02; G01M 11/085; G01M 13/005; G01M 13/022; G01M 15/11; G01M 17/02; G01M 3/182; G01M 3/22; G01M 3/223; G01M 3/28; G01M 3/366; G01M 5/0091; G01M 1/02; G01M 11/081; G01M 11/083; G01M 15/02; G01M 17/013; G01M 17/021; G01M 17/022; G01M 17/028; G01M 17/04; G01M 3/047; G01M 3/165; G01M 3/186; G01M 3/246; G01M 3/283; G01M 3/2884; G01M 3/3245; G01M 3/3254; G01M 3/3281; G01M 3/329; G01M 5/00; G01M 5/0016; G01M 7/00; G01M 9/02; G01M 9/04; G01M 9/062; G01M 13/028; G01M 15/05; G01M 17/06; G01M 3/007; G01M 3/02; G01M 3/12; G01M 3/14; G01M 3/187; G01M 3/202; G01M 5/0058

See application file for complete search history.

(56) References Cited

U.S. PATENT DOCUMENTS

| | | | | |
|---|---|---|---|---|
| 9,648,914 | B2 * | 5/2017 | Duncan | A42B 3/0486 |
| 9,730,482 | B2 * | 8/2017 | Allen | A42B 3/046 |
| 2003/0217601 | A1 | 11/2003 | Seals | |
| 2004/0025581 | A1 * | 2/2004 | Miller | G01L 19/12 73/146 |
| 2004/0261513 | A1 * | 12/2004 | Wiseman, Jr. | G01L 19/12 73/146 |
| 2016/0143383 | A1 * | 5/2016 | Allen | A42B 3/046 2/413 |
| 2018/0027895 | A1 | 2/2018 | Pickett | |
| 2025/0089908 | A1 * | 3/2025 | Huang | A47C 27/10 |

FOREIGN PATENT DOCUMENTS

| | | |
|---|---|---|
| JP | S52-000550 | 1/1977 |
| JP | H06-503981 | 5/1994 |
| JP | 2002-372471 | 12/2002 |
| JP | 2013-530081 | 7/2013 |
| WO | 92/11780 | 7/1992 |
| WO | 2011/159888 | 12/2011 |

OTHER PUBLICATIONS

Examination Report of British Patent Application No. 2104232.0, dated Sep. 14, 2022, 4 pages.

Examination Report of British Patent Application No. 2104232.0, dated Feb. 7, 2023, 5 pages.

Intention to Grant of British Patent Application No. 2104232.0, dated Jun. 21, 2023, 2 pages.

International Search Report and Written Opinion of PCT/GB2022/050740, Jun. 27, 2022, 17 pages.

English translation of Japanese Office Action issued in JP Application No. 2023-556532, dated Jan. 6, 2026, 7 pages.

* cited by examiner

PRESSURE GAUGE FOR AN INFLATABLE ARTICLE

FIELD OF THE INVENTION

The present disclosure relates to a pressure gauge for an inflatable article. The present disclosure also relates to an inflatable article comprising such a pressure gauge. The inflatable article is preferably an inflatable safety article, an inflatable protective article, or an inflatable helmet. The inflatable article may also be an inflatable kayak, an inflatable paddle board, an inflatable boat, or any other inflatable article.

The present disclosure also relates to an inflation valve comprising such a pressure gauge or an inflation unit comprising an inflation valve and such an pressure gauge.

BACKGROUND TO THE PRESENT INVENTION

Many types of pressure gauges are employed to monitor and provide an indication of the internal air pressure within an inflatable article. Most of these pressure gauges are provided on inflation devices, such as pumps, and require a separate mechanism in order to provide a pressure reading on a separate dial or meter to the gauge housing. As a result, such pressure gauges can be relatively big and not suitable for attaching to an inflatable article on a permanent basis.

Additionally, some mechanical pressure gauges cannot be relied upon to provide an accurate measurement of internal air pressure, particularly for inflatable articles that require a relatively low pressure (for example, below 50 psi (about 3.4 bar)). Many of these pressure gauges are provided on an inflatable device downstream of a valve mechanism and hose. As a result of this location, the pressure sensed by such pressure gauges, like those on a track pump, can be inaccurate due to any additional pressure build-up within the system. Such pressure build-up may inaccurately influence the reading of the actual pressure within the inflatable article being inflated. Furthermore, piston-based arrangements may also be too long to be attached to certain inflatable articles.

Therefore, the inventors have appreciated the need for a mechanical pressure gauge that is cost-effective to manufacture and capable of providing accurate pressure readings at relatively low pressures, while preferably being compact and integrally mountable to an inflatable article.

SUMMARY OF THE PRESENT INVENTION

The present invention provides a pressure gauge for an inflatable article. The pressure gauge comprises a housing. The pressure gauge comprises an indicating chamber defined within the housing. The pressure gauge comprises a diaphragm (or diaphragm element) located within the housing. The diaphragm is configured to expand upon an increase in pressure within the inflatable article. The diaphragm has a first surface and a second, opposing surface. The first surface of the diaphragm is configured to be in fluid communication with the interior of the inflatable article and the second surface of the diaphragm defines a boundary of the indicating chamber. The pressure gauge further comprises an indicating element located within the indicating chamber. An expansion of the diaphragm is configured to move the indicating element in a first direction away from a first or an initial position. The position of the indicating element relative to the housing provides an indication of the pressure within the inflatable article. In other words, the pressure gauge is configured so that the indicating element is moveable, by an expansion of the diaphragm, in a first direction away from a first position and so that the position of the indicating element relative to the housing provides an indication of the pressure within the inflatable article.

By having a separate indicating element within a separate chamber configured to move with movement of a diaphragm into the chamber so that the position of the indicating element relative to the housing provides an indication of the pressure within the inflatable article, the inventors have found that a compact pressure gauge can be made in a cost-effective manner with minimal components. Further, the inventors have found such an arrangement to be suitable for accurately measuring lower pressures (below 50 psi (about 3.4 bar), preferably below 25 psi (about 1.7 bar)), while also not requiring a separate dial to monitor the measured internal pressure of the inflatable article to which the gauge is connected.

Preferably, the expansion of the diaphragm is configured to push or drive the indicating element in a first direction away from a first position or an initial position. The initial or first position of the indicating element may correspond to the position of the indicating element when the internal pressure of the inflatable article is about 0 psi (about 0 bar). The initial position of the indicating element may correspond to the position of the indicating element when the internal pressure of the inflatable article approximately corresponds to the atmospheric pressure (at the altitude of where the inflatable article is located). Preferably, the indicating element is pushed from one longitudinal position to another longitudinal position. In other words, the first direction corresponds to a longitudinal or axial direction defined along the indicating chamber or pressure gauge.

Preferably, the position of the indicating element is configured to change longitudinally with respect to the housing of the pressure gauge. Preferably, the position of the indicating element relative to a longitudinal portion (or a longitudinally-extending portion) of the housing provides an indication of the pressure within the inflatable article. Such a longitudinal portion of the housing may correspond to a side or peripheral wall of the housing that extends along the longitudinal direction defined by the pressure gauge, which may be elongate.

Preferably, the indicating element is a separate or independent element or component from the diaphragm. In other words, the indicating element is not integral to the diaphragm.

Even more preferably, it is only the position of the indicating element relative to the housing which provides an indication of the pressure within the inflatable article. As a result, the pressure gauge can be provide in a compact and cost-effective manner without requiring a separate component or dial for a user to refer to in order to monitor the internal pressure within the article. The user may only need to refer to the relative position of the indicating element with respect to the housing in order to determine the pressure.

Preferably, the pressure gauge further comprises a biasing element located within the indicating chamber. The biasing element may be configured to move the indicating element in a second direction towards the initial position. Preferably, the biasing element comprises or consists of an elastic element or a spring element. The spring element may be a linear spring. The spring element may have a spring rate or spring constant of about 0.05 Newton per millimetre (N/mm) to about 0.15 N/mm. Preferably, the spring rate of the spring is about 0.12 N/mm.

By providing a biasing element that is configured to move the indicating element in a second direction towards the initial position, the indicating element may be arranged to return towards its original, initial position upon a reduction of pressure within the inflatable article. The second direction is preferably an opposing direction to the first direction. Similar to the first direction, the second direction preferably corresponds to a longitudinal or axial direction defined along the indicating chamber or pressure gauge.

Preferably, the housing extends along a longitudinal axis and the indicating element is configured to move along such a longitudinal axis. Further, the biasing element may be configured to move or push the indicating element along the same axis but in a direction away from the diaphragm.

Preferably, the housing comprises an outer housing or casing. The outer housing may define a cavity extending between an end wall and an open end of the outer housing. Such an end wall of the outer housing may be located within the outer housing. Such an end wall may have an opening extending through it to allow fluid communication between the interior of the inflatable article and the first surface or face of the diaphragm.

Preferably, the housing further comprises a tubular member or tubular portion located within the cavity defined by the outer housing. The tubular member or tubular portion is preferably transparent or translucent, so that the indicating element is visible through the housing.

Preferably, the diaphragm is located within the cavity defined by the outer housing and a peripheral portion of the diaphragm abuts the end wall of the outer housing.

Preferably, the diameter of the diaphragm is substantially the same as the diameter of the cavity. The diameter of the peripheral portion of the diaphragm may be the same as the diameter of the cavity. This ensures that an airtight seal is defined between the interior of the housing and the diaphragm so that air cannot flow into the indicating chamber from the interior of the inflatable article.

Preferably, the tubular member abuts the peripheral portion of the diaphragm. Preferably, the outer diameter of the tubular member is substantially the same as the diameter of the cavity. This ensures that the tubular member effectively abuts and retains the diaphragm in place between the end wall of the outer housing and the tubular member.

Preferably, the indicating chamber is defined by an internal surface of the housing, the tubular member and the second surface of the diaphragm. In other words, an internal surface of the housing, the inner surface of the tubular member and the second surface of the diaphragm define the boundaries of the indicating chamber, once the pressure gauge is assembled.

Preferably, the housing further comprises an end cap portion configured to seal the open end of the outer housing. The indicating chamber may be defined by an internal face of the end cap portion, the tubular member and the second surface of the diaphragm. In other words, an inner face of the end cap portion, the inner surface of the tubular member and the second surface of the diaphragm define the boundaries of the indicating chamber.

Alternatively, the end cap portion and the tubular member form a single integral component. Such a component may be referred to as an end cap element. The tubular member may form a tubular portion of the end cap element. The end cap element may comprise a retaining or locating protrusion or tab configured to engage with a corresponding retaining opening provided in the outer casing. Thus, upon assembly of the pressure gauge, the end cap element may be retained within the outer housing or casing.

Preferably, the indicating element is located between the diaphragm and the biasing element. Preferably, the indicating element abuts the second surface (or face) of the diaphragm. The indicating element may be coupled to the second surface of the diaphragm. The indicating element may have a diameter smaller than the internal diameter of the indicating chamber (defined by the tubular member). Alternatively, the indicating element may be establish a tight fit or a sliding fit with the tubular member or indicating chamber.

The diaphragm may comprise a locating protrusion extending from the second surface. Such a locating protrusion may extend from a central portion of the second surface. The indicating element extends from a first end to a second end. It is the first end of the indicating element that may engage (be coupled to or abut) with the diaphragm and the second end of the indicating element that may engage (be coupled to or abut) with the biasing element. The indicating element may comprise a locating recess arranged to cooperate with the locating protrusion of the diaphragm. The engagement between the locating protrusion of the diaphragm and the locating recess of the indicating element ensures that the expansion of the diaphragm Preferably, the biasing element abuts an internal surface of the housing. The biasing element may be coupled to an internal surface of the housing. Such an internal surface of the housing may be the internal face of the end cap (or end cap element) mentioned above. The end cap portion or element may comprise a locating protrusion extending from the internal face, which is configured to bound the indicating chamber. The biasing element extends between a first end and a second end. The second end of the biasing element may be arranged to cooperate with the locating protrusion. Such a locating protrusion is received within the biasing element (spring) so as to prevent any slipping or misalignment of the spring on the internal face of the end cap, especially under compression.

Preferably, the indicating element comprises a hollow or recessed portion that is configured to receive the biasing element. Such a hollow portion may extend from the second end of the indicating element to define an open end. The recessed portion may define a hollow portion or cavity portion that is configured to receive the first end of the biasing element, or spring. In this manner, secure engagement or abutment between the indicating element and the biasing element can be achieved as the biasing element is prevented from misaligning with the indicating element during operation of the pressure gauge. The recessed portion may have a closed end and an open end. The indicating element may also comprise a locating protrusion extending from the closed end of the recessed portion. Such a locating protrusion may cooperate or engage with the biasing element so that biasing element is aligned with the indicating element during movement.

Preferably, the pressure gauge (or the housing thereof) is mountable or coupleable to an inflatable article. In other words, the pressure gauge (or the housing thereof) may be configured to be mounted to or coupled to an inflatable article. The pressure gauge (or the housing thereof) may be configured to be mounted to or coupled to an outer wall of the inflatable article. The outer wall of the inflatable article may define an inflatable air chamber within the inflatable article. The pressure gauge may be configured to be in fluid communication with the interior of the inflatable article.

The housing or outer housing (or casing) may comprise a base (or base portion) configured to be coupled to the inflatable article. The base of the housing or outer housing may be flanged. By providing a flanged base, the housing has a suitably large interface for coupling to an inflatable article. The base portion of the outer housing may have a width or diameter between about 25 mm and about 75 mm. Preferably, the based portion of the outer housing has a width or diameter of about 50 mm.

Preferably, the components of the housing of the pressure gauge comprise a plastic material, nylon, thermoplastic polyurethane (TPU) or silicon. The outer housing is preferably made from TPU or polyvinyl chloride (PVC). Preferably, the outer housing is configured to be welded to an inflatable article. The tubular member or end cap element may comprise, or be made from, Poly(methyl methacrylate) (PMMA), such as Perspex: TPU, or PVC.

Preferably, the housing defines an air inlet that establishes a fluid communication between the interior of the inflatable article and the first surface of the diaphragm. The diaphragm separates the air inlet from the indicating chamber. The air inlet may be an air flow channel extending from an opening in the base portion of the housing (or outer housing/casing) to the first surface of the diaphragm. In such embodiments, the provision of a flanged base portion minimises the risk of air leakage as a suitable attachment can be ensured between the inflatable article and the housing.

Preferably, the indicating element is configured to be visible through an indicating portion of the housing. The indicating portion of the housing may be transparent or translucent. The indicating element is configured to be visible through the tubular member of the housing. As discussed, the tubular member is preferably transparent or translucent.

Preferably, the indicating element comprises a first indicator. The first indicator may comprise a marking, a notch, or a scale. The marking may be a line marking. The first indicator may be coloured.

Preferably, the housing or outer housing (or indicating portion thereof) may comprise an indicating opening or window. The position of the first indicator relative to the opening may provide an indication of the pressure within the inflatable article. As a result, a user may refer directly to the indicating element for a pressure reading instead of needing to refer to a separate dial or meter. The first indicator may be configured to be visible through the opening when a target operating pressure of the inflatable article is reached. A length of such an opening may be at least 3 mm. A length of such an opening may be at least 5 mm.

Preferably, the indicating portion of the housing has a second indicator. The position of the first indicator relative to the second indicator may provide an indication of the pressure within the inflatable article. An alignment of the opening of the housing or the second indicator with the first indicator may provide an indication that pressure within the inflatable article is approximately a target operating pressure of the inflatable article.

The second indicator may comprise a marking, a notch, or a scale. The marking may be a line marking. The second indicator may be coloured.

The first indicator may comprise a line and the second indicator may comprise a scale comprising a central line. An alignment of the line of the first indicator and the central line may provide an indication that the pressure within the inflatable article is approximately a target operating pressure of the inflatable article.

The pressure gauge may further comprise a magnifying element. The magnifying element may comprise a magnifying lens. The magnifying element may overlap an opening, such as the indicating portion mentioned above, in the housing such that the indicating element is visible through the magnifying element. In such embodiments, a first indicator may be provided on the indicating element and a second indicator may be provided on an outer surface of the magnifying element. A visual alignment of the first indicator with indicating elements (such as one or more markings or notches or a scale) of the second indicator may provide an indication of the pressure within the inflatable article. By providing a magnifying element, particularly with a second indicator on its outer surface, the lens may essentially provide a magnified view or image of the indicating element within the pressure gauge. As a result, a visual alignment of the magnified image of the first indicator located on the indicating element with the second indicator located on the magnifying element can provide an indication of the internal air pressure within an inflatable article. This would assist a user in more easily identifying whether a target or predetermined operating pressure of the inflatable article has been reached, without needing to obtain a closer view of the pressure gauge.

A target operating pressure refers to an optimum internal (air) pressure or range of pressure values at which an inflatable article (in particular, an inflatable helmet) is designed to operate and perform in an optimum manner. Preferably, the targeting operating pressure is between about 18 psi (about 1.2 bar) and about 25 psi (about 1.7 bar). More preferably, the targeting operating pressure is between about 20 psi (about 1.4 bar) and about 22 psi (about 1.5 bar). Where the inflatable article is an inflatable helmet, it is particularly important that the internal pressure within the helmet is at about the pre-determined operating pressure (in other words, the ideal, optimum or target operating pressure) at which the helmet's safety and impact performance characteristics are optimum. It may be particularly important that an inflatable or collapsible helmet is capable of withstanding structural forces of the conventional impact tests required for, for example, cycling helmets (for example, EN1078) during use in its inflated configuration.

Preferably, the diaphragm protrudes into the indicating chamber. The diaphragm may be concave. As a result, the first surface of the diaphragm is suitably sensitive to the internal fluid pressure of the inflatable article as the surface contact area is increased. Preferably, the diaphragm defines an airtight seal. This minimises an air or fluid leaking into the indicating chamber from the air inlet.

The diaphragm or diaphragm element may be a resilient diaphragm or diaphragm element. Preferably, the diaphragm comprises an elastic or rubber material. The diaphragm may be made from a thermoplastic elastomer (TPE). The diaphragm may be made from silicone rubber.

The diaphragm may have a diameter between about 2 mm and about 7 mm. The diaphragm may have a diameter between about 3 mm and about 5 mm. The diaphragm may preferably have a diameter of about 4 mm.

The diaphragm may have a thickness between about 0.02 mm and about 0.05 mm. More preferably, the diaphragm may have a thickness between about 0.03 mm and about 0.04 mm. The diaphragm may protrude about 2.8 mm into the indicating chamber in a relaxed state. The diaphragm may protrude about 5.5 mm into the indicating chamber in a stretched or expanded state. The diaphragm may protrude about 5.5 mm into the indicating chamber in a stretched or expanded state, when the internal air pressure within an inflatable article is approximately the target internal pressure. The diaphragm may protrude about 6.9 mm into the indicating chamber in its most stretched or expanded state.

Preferably, the diaphragm has a Shore A hardness between about 20 and about 35. Even more preferably, the diaphragm has a Shore A hardness between about 25 and about 30. Preferably, the diaphragm has a Shore A hardness of about 28.

The Shore A hardness of the diaphragm is measured in accordance with methods and standards known to the skilled person. The Shore A hardness may be determined in accordance with ASTM D2240 or ISO 868:2003. Except where otherwise stated, measurements are made at an ambient temperature of 23° C., an ambient air pressure of 100 kPa (0.986 atm) and a relative humidity of 50%.

The present disclosure relates to an inflation unit comprising the pressure gauge described herein. The inflation unit may comprise a pressure gauge and an inflation valve. The inflation unit may comprise a single housing integrating a pressure gauge, as described herein, and an inflation valve. In other words, the pressure gauge and the inflation valve may form a single integral unit.

The inflation valve may be a Presta valve. The inflation valve may be a Schrader valve. The housing of the inflation unit may have similar characteristics to the housing of the pressure gauge described herein. The housing may have a base portion. The base portion of the housing may be flanged. Features described in relation to the pressure gauge may be applied to the inflation unit or inflation valve. The inflation valve is in fluid communication with the interior of the inflatable article. The housing of the inflation unit preferably comprises a second air inlet for establishing fluid communication between the interior of the inflatable article and the inflation valve.

The inflation valve may be removeable from the inflation unit housing. This allows the inflation valve to be replaceable and allows interchangeability between various types of valves, such as Schrader or Presta, depending on the type of air pump available to a user. The inflation valve may define a transition fit or an interference fit with the housing.

The inflation unit may be referred to in the present disclosure as an inflation valve comprising a pressure gauge, as described in the present disclosure.

The present disclosure also relates to an inflatable article comprising the pressure gauge described herein. The inflatable article is preferably an inflatable safety article, an inflatable protective article, or an inflatable helmet. Most preferably, the inflatable article is an inflatable helmet. Examples of inflatable articles or helmets the pressure gauge of the present invention may be attached to are described in EP 3232844 B1 and GB 2020491.3. Preferably, the helmet is a cycling helmet.

The inflatable article may also be an inflatable kayak, an inflatable paddle board, an inflatable boat or any other inflatable article. Such inflatable articles may make use of welding (preferably, radiofrequency welding) or adhesive bonding to manufacture the article.

The pressure gauge, or inflation unit, may be integrated with the inflatable article. The pressure gauge, or inflation unit, may be attached or coupled to an outer surface or wall of the inflatable article. The pressure gauge, or inflation unit, is in fluid communication with the interior of the inflatable article. An air inlet of the pressure gauge, or inflation unit, is aligned with an aperture in a wall of the inflatable article. By providing such a compact pressure gauge, or inflation unit, directly on an inflatable article, a user may be able to inflate the inflatable article to a suitable operating pressure without the need for a pump having its own integral pressure gauge. Further, a pressure gauge, or inflation unit, permanently coupled to, or integrated with, the inflatable article is likely to be more accurate as it is direct fluid communication with the interior of the inflatable article. Preferably, the pressure gauge is positioned in the vicinity of an inflation valve of the inflatable article. Particularly, by providing a flanged base and a compact arrangement, the pressure gauge or inflation unit can be integrated or fixed to the chamber-defining wall (in other words, outer wall) of an inflatable article. This advantageously removes the need to have a pump that has an integrated pressure gauge, which may not even be accurate for lower pressures, or an auxiliary screw-on or temporarily coupleable gauge that needs to be attached to the valve upon inflating the inflatable article.

The combination of the pressure gauge, or inflation unit, with an inflatable article may be considered an inflatable system. According to the present disclosure, an inflatable system comprises an inflatable article and a pressure gauge, or inflation unit. Preferably, as discussed above, the pressure gauge, or inflation unit, is integrated with the inflatable article.

Preferably, the movement of the indicating element is parallel to the outer surface of the inflatable article to which the pressure gauge is attached. Alternatively, the movement of the indicating element is perpendicular to the outer surface of the inflatable article to which the pressure gauge is attached.

Preferably, the pressure gauge housing is coupled to the wall of the inflatable article by welding, even more preferably, by high-frequency welding. Preferably, the pressure gauge is permanently coupled or attached to an inflatable article. The pressure gauge may be adhered or bonded to the wall of the inflatable article.

The inflatable article may comprise a wall defining an inflatable chamber. The wall may be a collapsible wall. The wall (or outer or external wall) may comprise one or more layers or laminae. The wall may comprise a single layer. The wall may comprise an outer layer and inner layer. The outer layer may face the exterior of the inflatable article and the inner layer may face the interior of the inflatable article.

The wall of the inflatable article may comprise TPU or PVC. A layer or lamina of the wall of the inflatable article may comprise TPU or PVC. A thickness of the inflatable wall may be between about 0.25 mm and about 2 mm. A thickness of the inflatable wall may be between about 0.5 mm and about 1 mm. A thickness of a layer or lamina of the inflatable wall may be between about 0.25 mm and 1 mm. Preferably, a thickness of a layer or lamina of the inflatable wall may be about 0.5 mm.

The wall may comprise a cut-out portion. The base portion of the pressure gauge may be coupled to an inner surface of the wall and the rest of the housing of the pressure gauge may extend through the cut-out portion of the wall.

The wall may comprise a first air inlet opening. The inlet opening may be configured to establish a fluid communication between the pressure gauge and the interior of the inflatable article. The air inlet of the pressure gauge may be aligned with the inlet opening provided in the wall of the inflatable article so that a fluid communication is established between the diaphragm of the pressure gauge and the interior of the inflatable article.

The wall may comprise a second air inlet opening. The second inlet opening may be configured to establish a fluid communication between the inflation valve and the interior of the inflatable article. The air inlet of the inflation valve may be aligned with the second inlet opening provided in the wall of the inflatable article so that a fluid communication is established between the inflation valve and the interior of the inflatable article.

Preferably, an airtight seal is defined between the wall and the housing of the pressure gauge so that air cannot flow out of the inflatable article through any interface defined by the coupling of the pressure gauge to the wall and air can mainly flow through the air inlet of the pressure gauge. Any air leakage may affect the accuracy of the internal pressure indicated by the pressure gauge.

In embodiments of an inflatable article having a double-layered wall, the base portion of the housing of the inflation unit or pressure gauge may be located between an outer layer of the wall and an inner layer of the wall. A bottom surface of the base portion may be coupled to the outer surface of the inner layer and an upper surface of the base portion may be coupled to the inner surface of the outer layer. The inner layer may comprise a first inlet opening, as described above. The first inlet opening of the inner layer may align with the air inlet of the pressure gauge. The outer layer may comprise a cut-out portion, also as described above. The rest of the pressure gauge or inflation unit housing may protrude through the outer layer of the wall. The second inlet opening may be provided in the inner layer, similar to the first inlet opening.

Preferably, the housing of the pressure gauge or inflation unit extends at least 5 mm from an outer surface of the inflatable article. The housing of the pressure gauge or inflation unit may extend at least 7.5 mm from an outer surface of the inflatable article.

As used herein, the terms "preferably", "may", and "optionally", refer to features of the present invention which are not essential, but which may be combined to form various embodiments of the invention.

Furthermore, any feature in one aspect of the invention may be applied to other aspects of the invention, in any appropriate combination. In particular, method aspects may be applied to apparatus aspects, and vice versa. Further, any, some and/or all features in one aspect can be applied to any, some and/or all features in any other aspect, in any appropriate combination.

It should also be appreciated that particular combinations of the various features described and defined in any aspects of the invention can be implemented and/or supplied and/or used independently.

SPECIFIC DESCRIPTION OF FIGURES

Specific embodiments will now be described with reference to the figures, in which.

Figure 8A:
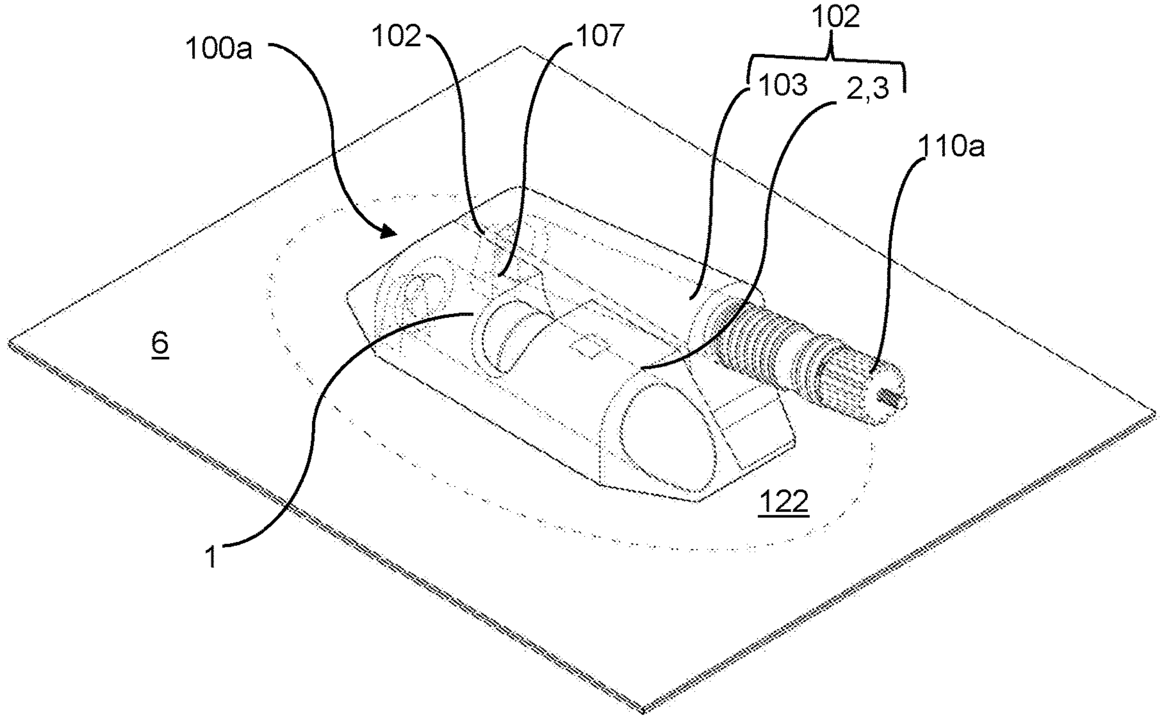
Figure 8B:
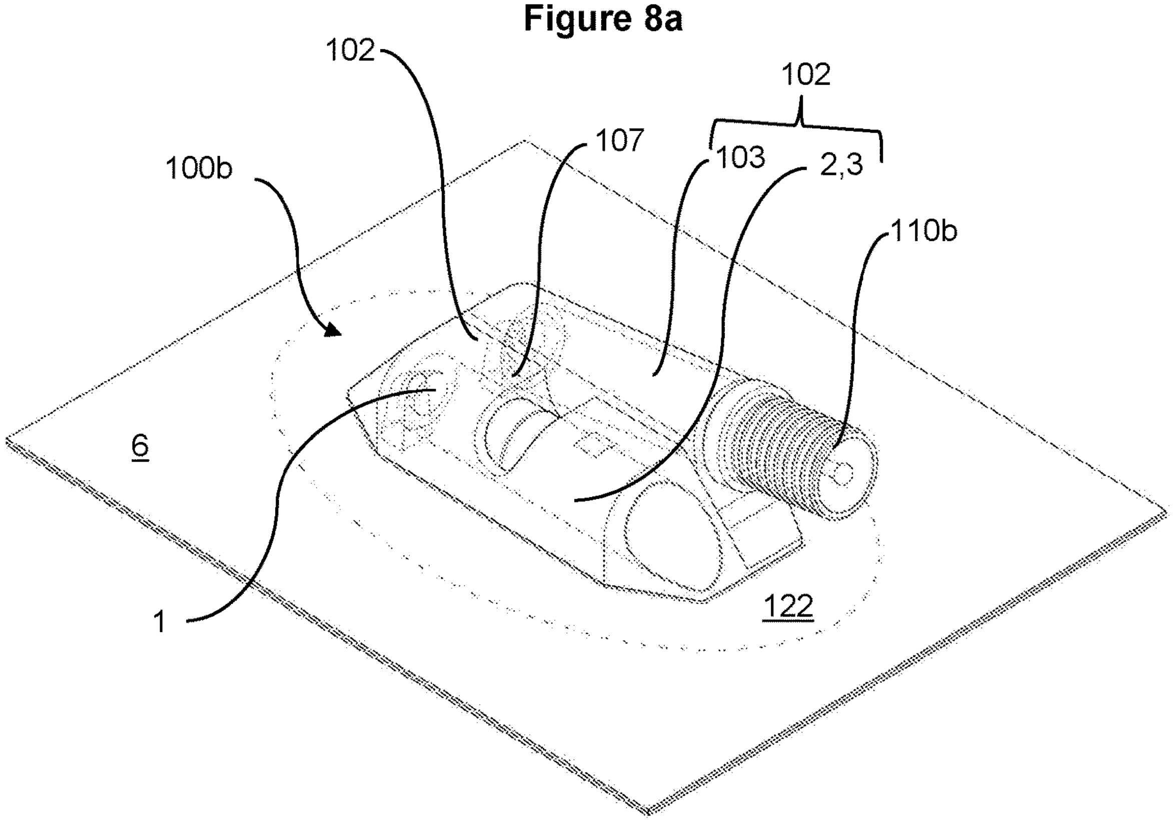
Figure 9:
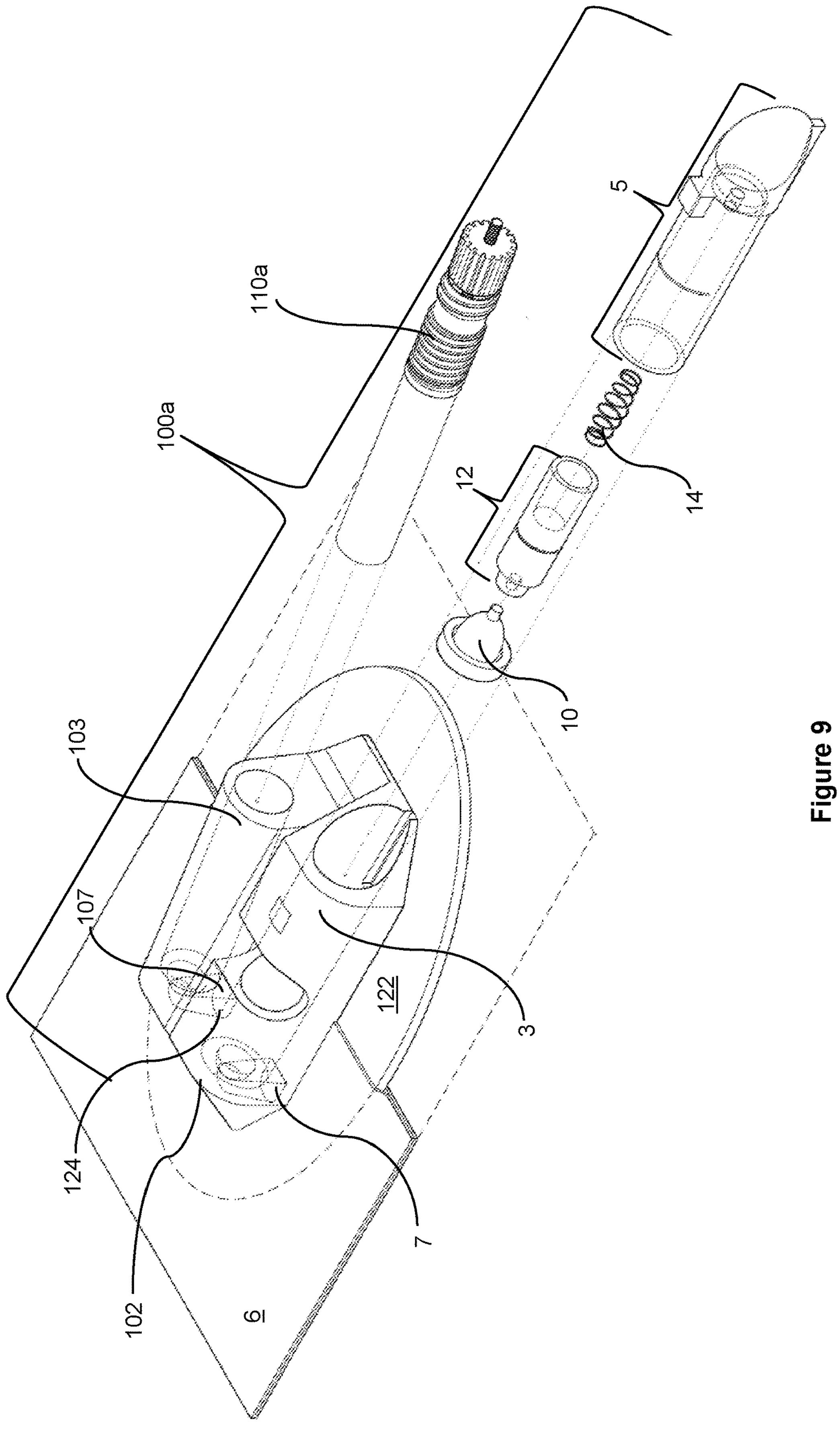
Figure 10A:
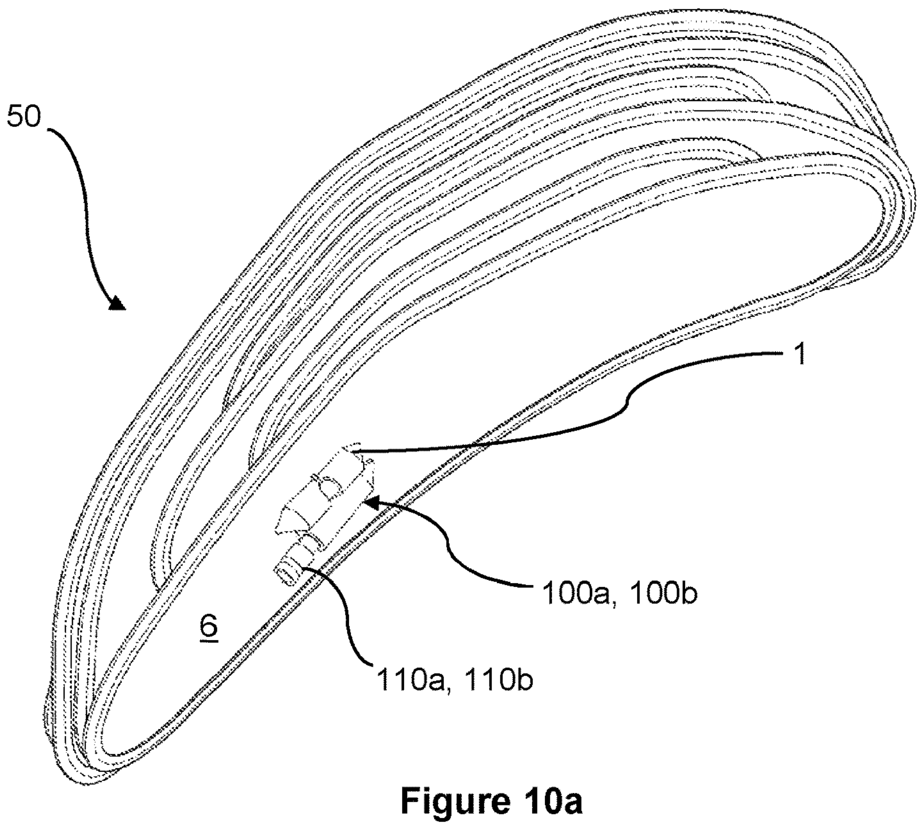
Figure 10B:
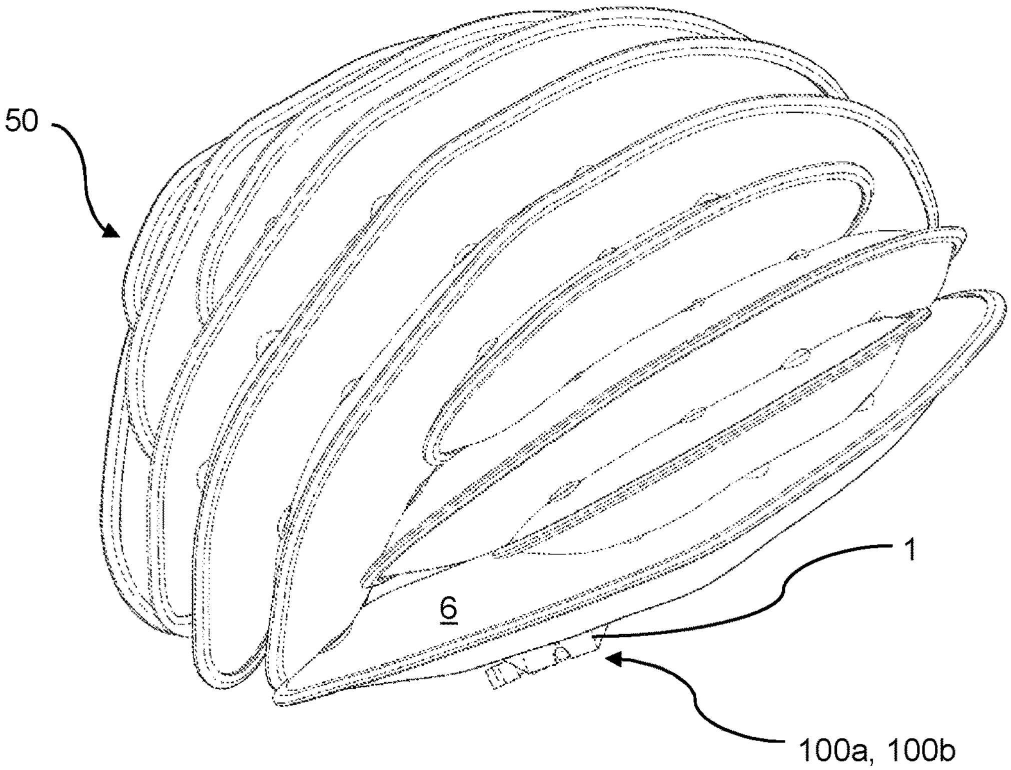

FIGS. 8*a* & 8*b* respectively show a perspective view of a pressure gauge incorporating a Presta valve and a Schrader valve;

FIG. 9 shows an exploded perspective view of a pressure gauge shown in Figure Ba; and FIGS. 10*a* & 10*b* show a perspective view of an inflatable helmet incorporating a pressure gauge shown in FIGS. 8*a* & 8*b* in a deflated configuration and in an inflated configuration, respectively.

Figure 1:
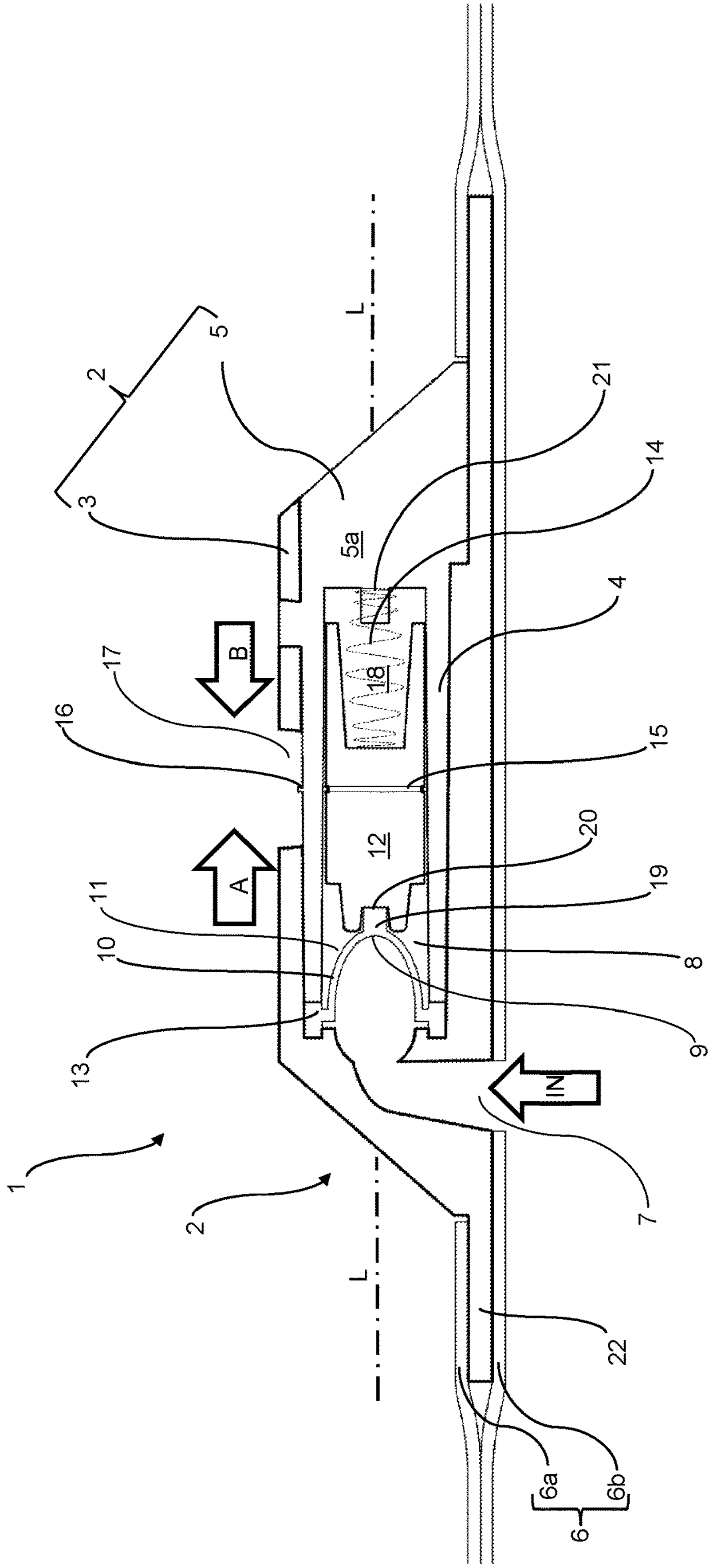
FIG. 1 shows a schematic sectional view of a pressure gauge in accordance with the present invention.

FIG. 1 shows an embodiment of a pressure gauge 1, in accordance with the present invention, coupled to an inflatable article (not shown in its entirety). The outer boundary of such an inflatable article is represented in FIG. 1 by the outer wall 6.

The pressure gauge 1 comprises a housing 2 extending along a longitudinal axis L. The housing 2 comprises an outer housing or casing 3 and an end cap element 5 arranged to cooperate with the outer housing 3. The end cap element 5 comprises an end cap portion 5*a* and a tubular portion 4 extending within the outer housing 3.

The pressure gauge 1 comprises an indicating chamber 8 that is defined within the housing 2. The pressure gauge 1 comprises a resilient diaphragm 10 having a first surface 9 and a second, opposing surface 11. The diaphragm 10 has a concave shape so as to extend or protrude into the indicating chamber 8. When the pressure gauge 1 is attached to an inflatable article, the first surface 9 of the diaphragm 10 is configured to be in fluid communication with the interior of an inflatable article. An air inlet 7 is defined within the outer housing 3 and extends from a base portion 22 of the housing 2 (or outer housing 3) to the first surface 9 of the diaphragm 10. The diaphragm 10 separates the indicating chamber 8 from the air inlet or conduit 7. As shown in FIG. 1, air from the interior of the inflatable article is configured to enter the pressure gauge 1 along a direction IN.

The second surface 11 of the diaphragm 10 defines a boundary of the indicating chamber 8. The diaphragm 10 is configured to expand in a first direction A upon an increase in pressure within the inflatable article the pressure gauge 1 is coupled to.

The pressure gauge 1 comprises an indicating element 12, the position of which with respect to the housing 2, in particular the tubular portion 4, provides an indication of the internal pressure within the inflatable article (not shown in FIG. 1) the pressure gauge 1 is coupled to. The indicating element 12 is located within the indicating chamber 8. Expansion of the diaphragm 10 in the first direction A is configured to push the indicating element 12 in the same direction so that the indicating element 12 moves along the longitudinal axis L within the indicating chamber 8.

The pressure gauge 1 comprises a biasing element 14 located within the indicating chamber 8. The biasing element 14 is configured to compress when the pressure within the inflatable article increase and the indicating element 12 pushes against the biasing element 14. In this embodiment, the biasing element 14 is a spring. The indicating element 12 is located between the diaphragm 10 and the biasing element 14. When the pressure within the inflatable article decreases, the diaphragm 10 no longer expands and no longer pushes against the indicating element 12. As a result, the compressed biasing element 14 is configured to push the indicating element 12 in a second direction B opposite to the first direction A towards an initial position. Both first and second directions A, B are parallel to the longitudinal axis L.

The indicating chamber 8 is bound by the second surface 11 of the diaphragm 10, the internal surface of the tubular member 4 and an internal face of the end cap 5.

As mentioned above, the indicating element 12 is located immediately between the diaphragm 10 and the biasing element 14. The diaphragm 10 comprises a first locating protrusion 19 extending into the indicating chamber 8 from the second surface 11. A first end of the indicating element 12 has a corresponding recess 20 arranged to cooperate and engage with the first locating protrusion 19.

The indicating element 12 comprises a hollow, recessed portion 18 that receives the biasing element 14. The recessed portion 18 extends from a second end of the indicating element 12 to define an open end of the indicating element 12. The recessed portion 18 therefore defines a hollow portion or cavity portion that is configured to receive a first end of the biasing element 14. In other words, the biasing element 14 extends into the recessed portion 18 of the indicating element 12 and abuts against an internal end wall or surface located within the indicating element 12.

The indicator element 12 comprises a first indicator 15, which is configured to be visible through the housing 2 of the pressure gauge 1. As shown in FIG. 1, the housing 2 comprises an opening or window 17 defined in the longitudinal wall of the outer casing 3. The tubular portion 4 of the end cap element 5 has a second indicator 16 located thereon, which is also visible through the window 17 of the outer casing 3. The end cap element 5 comprises a transparent material such as PVC or PMMA, such as Perspex. As shown in FIG. 1, the first indicator 15 comprises an indentation circumscribing the outer surface of the indicating element 12 and the second indicator 16 comprises a protrusion provided on the surface of the tubular portion 4. The first and second indicators 15, 16 are preferably coloured for ease of visibility. The first and second indicators 15, 16 may be red.

The relative position of the indicating element 12, in particular the first indicator 15, relative to the second indicator 16 provides an indication of the internal pressure within the inflatable article. Depending on the application of the pressure gauge 1, the alignment of the first and second indicators 15, 16 will indicate that the internal pressure within the inflatable is an ideal operating or target pressure of the inflatable article to which the pressure gauge 1 is applied. As shown in FIG. 1, the first indicator 15 is aligned with the second indicator 16, thereby indicating to a user that the inflatable article has been inflated to a preferred, operating internal pressure. Such an indication is defined by the balance of forces exerted on the indicating element 12 between the diaphragm 11 under expansion and the biasing element or spring 14 under compression.

Figure 2:
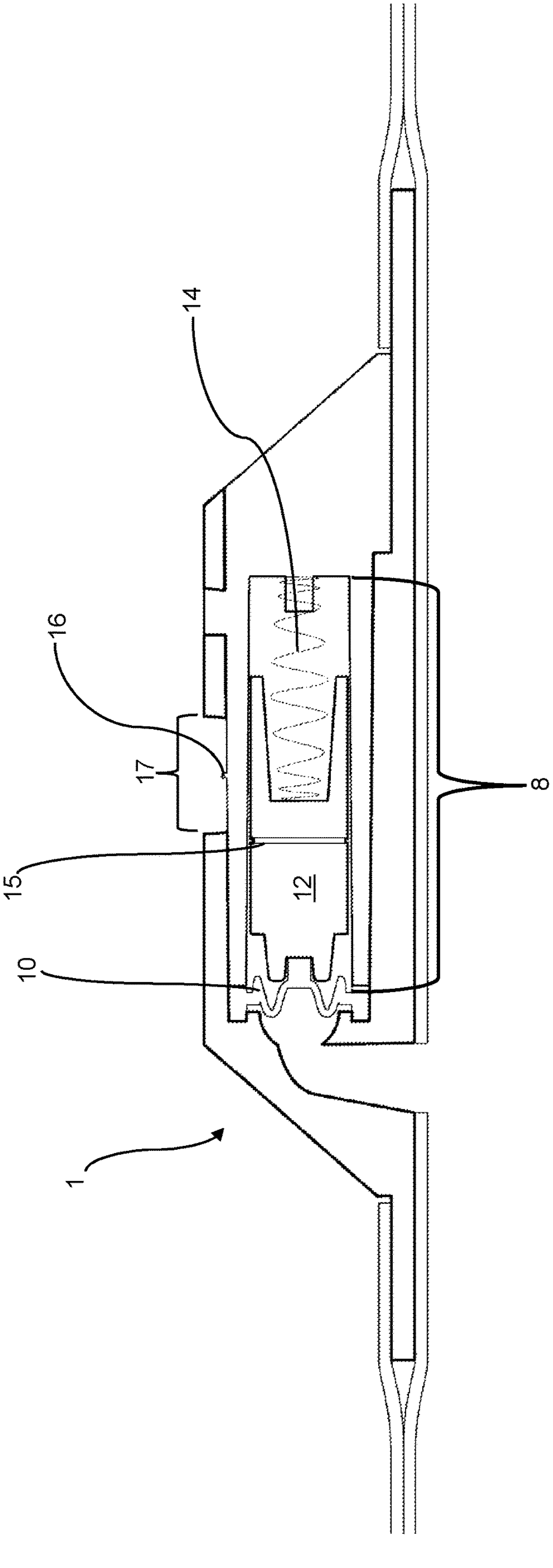
FIG. 2 shows a schematic sectional view of a pressure gauge in accordance with the present invention in a low pressure configuration.

FIG. 2 shows the same pressure gauge 1 of FIG. 1 but when the inflatable article (not shown) is in a lower pressure or deflated state. As shown in FIG. 2, the diaphragm 10 may be substantially in or near an initial, collapsed or unexpanded (or relaxed) state, where the force exerted by the biasing element 14 on the indicating element 12 is greater than a force exerted by the diaphragm 10 on the indicating element 12, which is in turn subject to the internal pressure present within the inflatable article. As a result, a misalignment or offset is present between the first indicator 15 and the second indicator 16, where the first indicator 15 is located at a longitudinal position between the second indicator 16 and the diaphragm 10, thereby indicating that the internal pressure is either near zero or below the target operating internal pressure of the inflatable article. Upon inflation (in other words, an increase in pressure) of the inflatable article, the diaphragm 10 will expand, thereby pushing the indicating element 12 in first direction A towards the configuration shown in FIG. 1.

Figure 3:
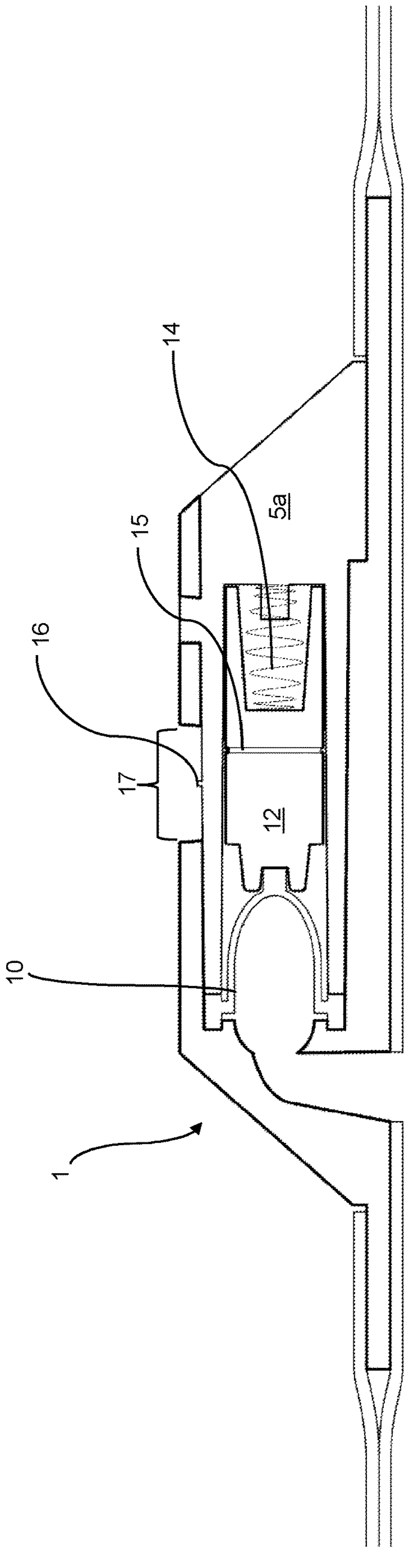
FIG. 3 shows a schematic sectional view of a pressure gauge in accordance with the present invention in a high pressure configuration.

FIG. 3 shows the same pressure gauge 1 of FIGS. 1 & 2 but when the inflatable article (not shown) is in a high pressure, overinflated state. The diaphragm 10 is in an overexpanded state, where the force exerted by the expansion of the diaphragm 10 on the indicating element 12, as a result of the relatively high air pressure present within the inflatable article, is greater than the restorative force exerted by the spring 14 on the indicating element 12. As a result, a misalignment or offset is also present between the first indicator 15 and the second indicator 16, where the first indicator 15 is located a longitudinal position between the second indicator 16 and the end cap portion 5*a*, thereby indicating that the internal pressure is above the target operating internal pressure of the inflatable article. Upon deflation (in other words, a decrease in pressure) of the inflatable article, the diaphragm 10 will collapse or restore its initial relaxed state by virtue of its resilient characteristics, thereby allowing the biasing element 14 to push the indicating element 12 in the second direction B towards any one of the configurations shown in FIGS. 1 & 2.

As shown in FIG. 3, an end of the indicating element 12 is in abutment with the internal wall of the end cap portion 5*a*. This indicates that the internal pressure within the inflatable article is above the desired operating internal pressure of the inflatable article and is at, or near, the maximum pressure the inflatable article is configured to sustain. This beneficially indicates to a user that the lack of further movement of the indicating element 12 towards to the end cap portion 5*a* (in other words, along first direction A) means that the air pressure is too high for the particular inflatable article the pressure gauge 1 is provided on. Preferably, in such a configuration or state, the first indicator 15 remains visible when the indicating element 12 abuts an end wall defining the indicating chamber 8.

Figure 4:
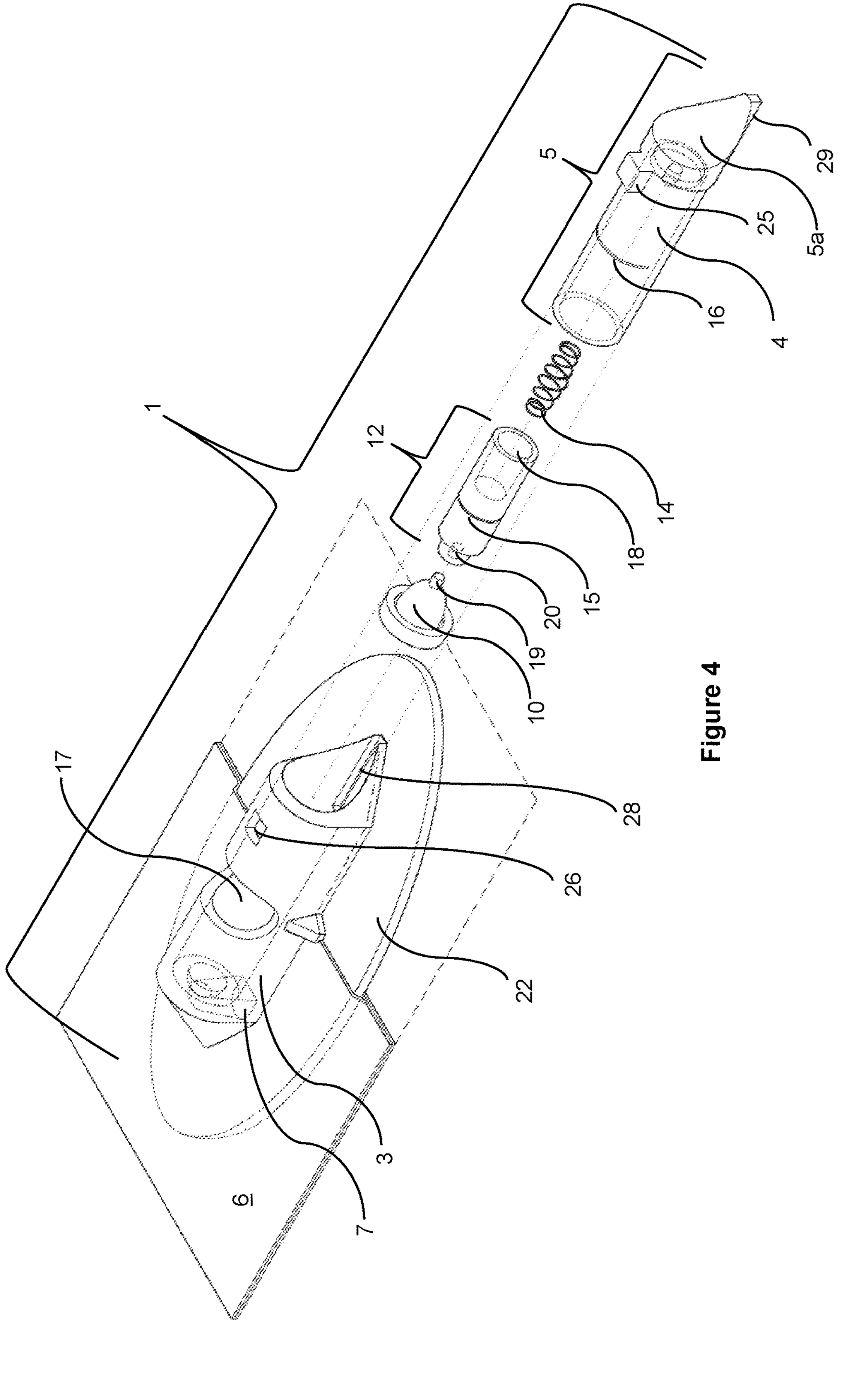
FIG. 4 shows an exploded perspective view of a pressure gauge in accordance with the present invention.

FIG. 4 shows an exploded view of the pressure gauge 1 and how the various components of the pressure gauge 1 can be assembled. Once the outer casing 3 is coupled to outer wall 6 of an inflatable article, the diaphragm 10 can be inserted into the outer casing 3. The indicating element 12 can be inserted such that a first end of the indicating element 12, which has the recess 20, cooperates with the first locating protrusion 19 of the diaphragm 10. The spring 14 can then be inserted in the casing 3 to cooperate with the second end of the indicating element 12, which comprises the recessed portion 18. The end cap element 5 is then inserted into the outer casing 3 so that the tubular portion 4 of the end cap element 5 abuts with a peripheral portion of the diaphragm 10 and encloses the indicating element 12 and spring 14 within the tubular portion 4. As discussed above, the end cap element 5 comprises a locating protrusion 21 provided on an internal surface of the end cap element 5. The first end of the spring 14, and portion extending therefrom, is arranged to be positioned within the recessed portion 18 of the indicating element 12 and the second end of the spring 14 is arranged to engage or cooperate with such a locating protrusion 21. The cooperation of the spring 14 with the recessed portion 18 and the locating protrusion 21 ensures that the spring 14 is retained suitably in place during use.

The end cap element 5 is arranged to be retained within the outer casing 3. The engagement between a locating tab or protrusion element 25 provided on the end cap element 5 and a retaining opening 26 provided on the outer casing 3 ensures that the end cap element 5 is retained in place within the outer casing 3 upon insertion. Furthermore, the outer casing 3 is provided with a guide track 28, which cooperates with a corresponding elongate guide protrusion 29 provided on a surface of the end cap element 5. The cooperation between the guide track 28 and the protrusion 29 ensures that the end cap element 5 is aligned within the outer casing 3 and is provided at an appropriate position and orientation within the casing 3.

Figure 5:
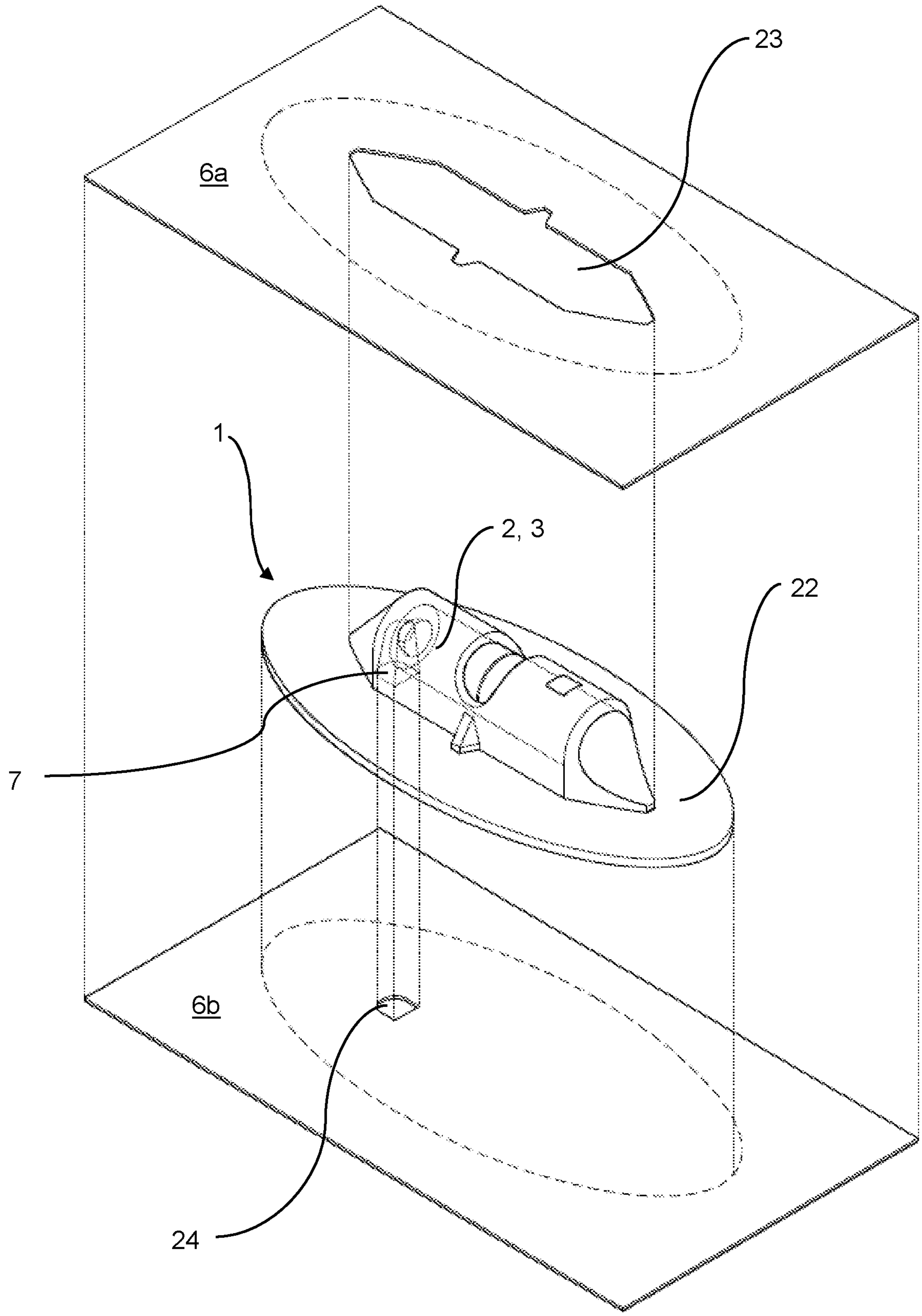
FIG. 5 shows a perspective view of a pressure gauge in accordance with the present invention and how the pressure gauge integrates with the wall structure of an inflatable article.

FIG. 5 shows an example of how the pressure gauge 1 can be coupled to, or integrated with, an inflatable article (not shown in its entirety), more precisely the outer wall thereof. As mentioned above, the pressure gauge 1 is configured to be coupled to an outer wall 6 of an inflatable article. Such an outer wall 6 is preferably a wall defining an inflatable air chamber of the inflatable article. The outer wall 6, as shown in FIGS. 1-3 & 5, comprises an outer layer 6*a* and an inner layer 6*b*. As shown in FIGS. 1-3 & 5, a flanged base portion 22 of the outer housing 3 is positioned between the outer layer 6*a* and inner layer 6*b*. The flanged base portion 22 can be either adhered or welded to the either or both of the outer or inner layers 6*a*, 6*b* of the wall 6. At least the bottom surface of the base portion 22, which interfaces with the outer surface of the inner layer 6*b*, is coupled to the inner layer 6*b* to ensure that an airtight seal is formed between the housing 2 of the pressure gauge 1 and the inner layer 6*b*. This ensures that air does not leak when flowing to and through the air inlet 7 into the interior of the pressure gauge 1. The top surface of the base portion 22 may also be coupled to (adhered or welded to) the inner surface of the outer layer 6*a*.

The outer layer 6*a* comprises a cut-out portion 23 through which the pressure gauge 1 extends in order to be exposed on the outer surface of an inflatable article. The inner layer 6*b* comprises an inlet opening 24 allowing fluid communication between the diaphragm 10 and the interior of the inflatable article.

Figure 6:
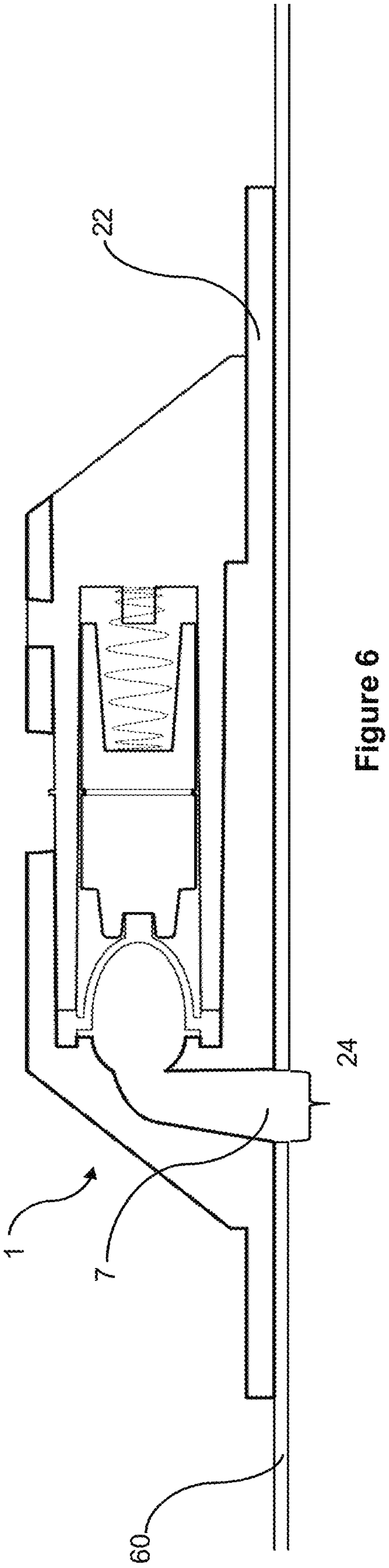
FIG. 6 shows a schematic sectional view of a pressure gauge coupled to an outer surface of a wall structure of an inflatable article.
Figure 7:
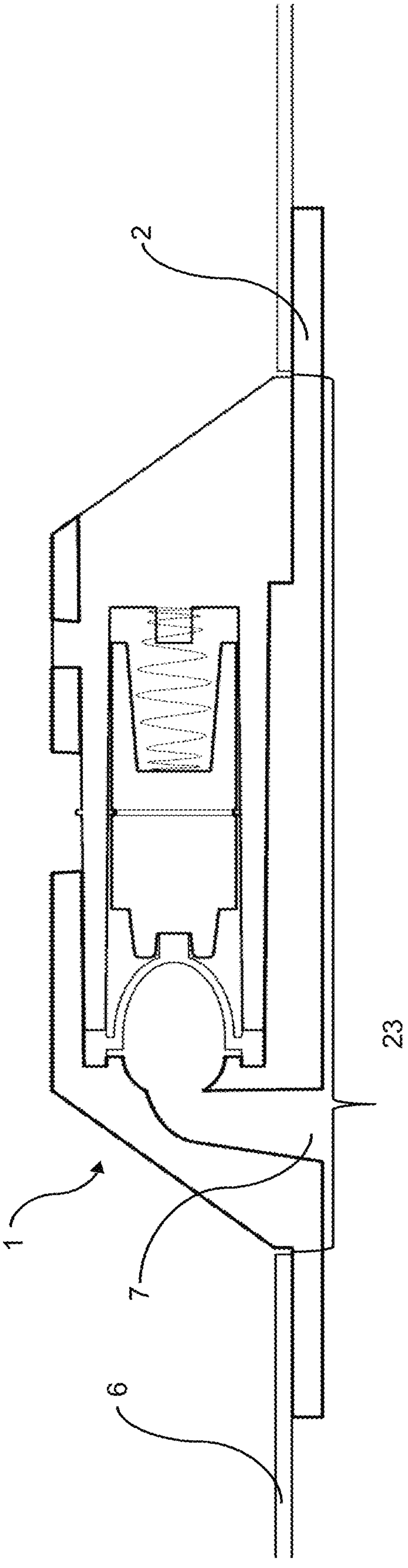
FIG. 7 shows a schematic sectional view of a pressure gauge coupled to an inner surface of a wall structure of an inflatable article.

FIGS. 6 & 7 show examples of how the pressure gauge 1 can coupled to, or integrated with, an inflatable article having a single-layer wall 60. The wall 60 performs a similar function as the double-layer wall 6, discussed above. For a single-layer wall 60, the pressure gauge 1 can be coupled in two different manners. The structure of the pressure gauge 1 is equivalent to that described above.

The pressure gauge 1 can be coupled to the outer surface of the wall 60. As shown in FIG. 6, the bottom surface of the flanged base portion 22 of the housing 2 is coupled directly to the outer surface of the wall 60. This can be done by welding or adhesive bonding. As shown in FIG. 6, the wall 60 comprises the inlet opening 24 for establishing a fluid communication between the diaphragm 10 and the interior of the inflatable article, which is defined by the wall 60.

Alternatively, the pressure gauge 1 can be coupled to the inner surface of the wall 60. As shown in FIG. 7, an upper surface of the flanged based portion 22 is coupled directly to an inner surface of the wall 60. This can be done by welding or adhesive bonding. However, a cut-out portion 23 is provided in the wall (similar to that of the outer layer 6*a*, as shown in FIG. 5) so that the rest of the pressure gauge 1 body can protrude through the wall 60. The portion of the pressure gauge housing 2 protruding from the inflatable article may protrude at least about 8 mm, measured perpendicularly from an outer surface of the wall 6, 60.

FIGS. 8*a* & 8*b* show embodiments of an inflation unit 100*a*, 100*b* comprising an inflation valve 110 and a pressure gauge 1, as described above. In the present disclosure, the inflation unit 100*a*, 100*b* may be referred to as a pressure gauge comprising an inflation valve or as an inflation valve comprising a pressure gauge.

The inflation unit 100*a*, 100*b* comprises a housing 102. The housing 102 comprise a pressure gauge housing 2, in line with the housing 2 described above, and a valve housing 103. Preferably, the pressure gauge housing 2 and the valve housing 103 form an integral housing unit 102. The valve housing 103 is configured to house and receive an inflation valve 110*a*, 110*b*. The valve housing 103 comprises a second air inlet or channel 107, similar to the first air inlet 7, that provide fluid communication between the inflation valve and the interior of the inflatable article. The second air inlet 107 is aligned with a second air inlet opening 124 provided in the wall 6, which is similar to the first air inlet opening 24. The second air inlet opening 124 is provided in the inner layer 6*b*, similar to the first air inlet opening 24 shown in FIG. 5.

As shown in FIG. 8*a*, the inflation valve of the inflation unit 100*a* can be a Presta valve 110*a* and, as shown in FIG. 8*b*, the inflation valve of the inflation unit 100*b* can be a Schrader valve 110*b*. FIG. 9 shows an exploded view of the inflation unit 100*a*.

FIGS. 10*a* & 10*b* show an inflatable helmet 50 comprising an inflation unit 100*a*, 100*b*, as described above. The inflatable helmet may alternatively comprise a pressure gauge 1, which is not integrated with an inflation valve. In other words, instead of an inflation unit with an integrated inflation valve, an individual pressure gauge 1 can be applied in a similar manner to the inflatable helmet 50. In such cases, the inflatable helmet comprises a separate inflation valve. The inflation unit 100*a*, 100*b* is permanently coupled to the inflatable article, which is an inflatable helmet 50.

FIG. 10*a* shows the helmet 50 in a deflated configuration and FIG. 10*b* shows the helmet 50 in an inflated configuration. During inflation from a deflated configuration shown in FIG. 10*a* to an inflated configuration as shown in FIG. 10*b* using the inflation valve 110, a user can monitor the internal air pressure of the inflatable helmet through the pressure gauge 1 (by the position of the indicating element 12). Upon alignment of the first and second indicators 15, 16 described above, an indication is provided to a user inflating the helmet 50 that the internal air pressure has approximately reached an ideal operating pressure of the helmet 50. For the helmet 50, the ideal or target operating pressure is about 22 psi (about 1.5 bar). In the context of the helmet 50, it is particularly important that a user is informed that the internal pressure within the helmet is at about the pre-determined operating pressure (in other words, the ideal, optimum or target operating pressure) at which the helmet's safety and impact performance characteristics are optimum.

The specific embodiments and examples described above illustrate but do not limit the invention. It is to be understood that other embodiments of the invention may be made and the specific embodiments and examples described herein are not exhaustive.

The invention claimed is:

1. An inflatable helmet comprising:
a pressure gauge, the pressure gauge comprising:
  a housing;
  an indicating chamber defined within the housing;
  a resilient diaphragm located within the housing and configured to expand upon an increase in pressure within the inflatable helmet, the diaphragm having a first surface and a second surface opposing the first surface, wherein the first surface of the diaphragm is configured to be in fluid communication with an interior of the inflatable helmet and wherein the second surface of the diaphragm defines a boundary of the indicating chamber; and
  an indicating element located within the indicating chamber, wherein the pressure gauge is configured so that the indicating element is moveable, by an expansion of the diaphragm, in a first direction away from a first position and the position of the indicating element relative to the housing provides an indication of the pressure within the inflatable helmet, wherein the inflatable helmet has a helmet shape in an inflated configuration.

2. The inflatable helmet according to claim 1, wherein the pressure gauge includes a biasing element located within the indicating chamber, wherein the biasing element is configured to move the indicating element in a second direction towards the first position.

3. The inflatable helmet according to claim 2, wherein the biasing element comprises a spring.

4. The inflatable helmet according to claim 1, comprising: an outer wall, the pressure gauge being coupled to the outer wall of the inflatable helmet.

5. The inflatable helmet according to claim 1, wherein the housing comprises a base portion configured to be coupled to the inflatable helmet.

6. The inflatable helmet according to claim 5, wherein the base portion of the housing is flanged.

7. The inflatable helmet according to claim 1, wherein the housing defines an air inlet that establishes a fluid communication between the interior of the inflatable helmet and the first surface of the diaphragm.

8. The inflatable helmet according to claim 1, wherein the indicating element is configured to be visible through an indicating portion of the housing.

9. The inflatable helmet according to claim 1, wherein the indicating element comprises a first indicator.

10. The inflatable helmet according to claim 9, wherein the housing comprises an opening, wherein the position of the first indicator relative to the opening provides the indication of the pressure within the inflatable helmet.

11. The inflatable helmet according to claim 1, wherein a target operating pressure of the inflatable helmet is between about 20 psi and about 22 psi.

12. The inflatable helmet according to claim 1, wherein the diaphragm protrudes into the indicating chamber.

13. The inflatable helmet according to claim 1, wherein the indicating element abuts or is coupled to the second surface of the diaphragm.

14. The inflatable helmet according to claim 2, wherein the indicating element is located between the diaphragm and the biasing element.

15. The inflatable helmet according to claim 1, comprising:

an inflation unit including the pressure gauge and an inflation valve.

16. The inflatable helmet according to claim 15, wherein the pressure gauge and the inflation valve form a single integral unit.

17. The inflatable helmet according to claim 9, wherein the first indicator comprises a marking, a notch, or a scale.

18. The inflatable helmet according to claim 12, wherein the diaphragm is concave.

19. The inflatable helmet according to claim 15, wherein the inflation valve includes a Presta valve or a Schrader valve.

20. The inflatable helmet according to claim 1, wherein the inflatable helmet has the inflated configuration and a deflated configuration.

* * * * *